(12) United States Patent
Mullins et al.

(10) Patent No.: US 11,128,638 B2
(45) Date of Patent: Sep. 21, 2021

(54) LOCATION ASSURANCE USING LOCATION INDICATORS MODIFIED BY SHARED SECRETS

(71) Applicant: RSA Security LLC, Bedford, MA (US)

(72) Inventors: Brian C. Mullins, Burlington, MA (US); Zulfikar A. Ramzan, Saratoga, CA (US)

(73) Assignee: RSA Security LLC, Bedford, MA (US)

(*) Notice: Subject to any disclaimer, the term of this patent is extended or adjusted under 35 U.S.C. 154(b) by 304 days.

(21) Appl. No.: 16/261,941

(22) Filed: Jan. 30, 2019

(65) Prior Publication Data

US 2020/0244670 A1 Jul. 30, 2020

(51) Int. Cl.
*H04L 29/06* (2006.01)
*H04L 9/32* (2006.01)

(52) U.S. Cl.
CPC .......... *H04L 63/107* (2013.01); *H04L 9/3271* (2013.01)

(58) Field of Classification Search
CPC ............................ H04L 63/107; H04L 9/3271
See application file for complete search history.

(56) References Cited

U.S. PATENT DOCUMENTS

| | | | | |
|---|---|---|---|---|
| 2009/0006254 A1* | 1/2009 | Mumm | ................ | G06Q 20/385 705/44 |
| 2010/0050243 A1* | 2/2010 | Hardt | .................... | H04L 9/3271 726/6 |
| 2012/0313754 A1* | 12/2012 | Bona | ...................... | G07C 9/257 340/5.82 |
| 2014/0125574 A1* | 5/2014 | Scavezze | .............. | H04W 12/06 345/156 |
| 2017/0012996 A1 | 1/2017 | Hu et al. | | |
| 2017/0026422 A1* | 1/2017 | Klein | .................. | H04L 65/1069 |
| 2017/0104597 A1* | 4/2017 | Negi | ..................... | H04L 9/0816 |
| 2017/0373861 A1* | 12/2017 | Jain | ..................... | H04L 63/0861 |

(Continued)

OTHER PUBLICATIONS

Park et al. Self-Controllable Secure Location Sharing for Trajectory-Based Message Delivery on Cloud-Assisted VANETs, Sensors (Basel) Jul. 2018; 18(7): 2112. https://www.ncbi.nlm.nih.gov/pmc/articles/PMC6068972/.

(Continued)

*Primary Examiner* — Ghodrat Jamshidi
(74) *Attorney, Agent, or Firm* — Danielson Legal LLC

(57) ABSTRACT

Techniques are provided for user authentication using a location assurance based on a location indicator modified by a shared secret. One method comprises obtaining a shared secret; initiating a challenge in connection with an authentication request by a client from a given location to access a protected resource, wherein the challenge comprises a location indicator selected for the given location; processing a response submitted by the client in response to the challenge, wherein the response comprises the location indicator for the given location modified by the client with the shared secret, and wherein the processing comprises evaluating the response submitted by the client relative to the location indicator selected by the authentication server; and resolving the authentication request based on the evaluating. The client modification of the selected location indicator with the shared secret comprises, for example, decrypting, filtering and/or altering the location indicator based on the shared secret.

19 Claims, 9 Drawing Sheets

(56) References Cited

U.S. PATENT DOCUMENTS

| | | | |
|---|---|---|---|
| 2018/0053352 A1* | 2/2018 | Finding | H04N 5/33 |
| 2018/0068103 A1* | 3/2018 | Pitkanen | H04L 63/0861 |
| 2018/0158156 A1* | 6/2018 | Dintenfass | G06K 9/00671 |
| 2018/0158157 A1* | 6/2018 | Dintenfass | G06Q 30/0278 |
| 2018/0232937 A1* | 8/2018 | Moyer | A63F 13/65 |
| 2019/0058700 A1* | 2/2019 | Kurian | H04W 12/63 |
| 2019/0104409 A1* | 4/2019 | Wu | H04W 64/003 |
| 2019/0311096 A1* | 10/2019 | Eldefrawy | H04L 9/008 |
| 2020/0134159 A1* | 4/2020 | Ford | G06F 21/46 |

OTHER PUBLICATIONS

Pokémon GO, Pokémon Video Games, © 2019 Pokémon. TM, ® Nintendo. https://www.pokemon.com/us/pokemon-video-games/pokemon-go/.

* cited by examiner

LOCATION ASSURANCE USING LOCATION INDICATORS MODIFIED BY SHARED SECRETS

FIELD

The field relates generally to information processing systems, and more particularly to authentication techniques in such systems.

BACKGROUND

In order to gain access to applications or other resources via a computer or another user device, users are often required to authenticate themselves by entering authentication information. Location assurance techniques (e.g., for establishing a location of a user at a time of an authentication) can be helpful for authentication services to determine an appropriate level of security required to access protected resources. For example, a given user trying to authenticate from an established "safe" location, such as a home or office of the given user, might have to encounter fewer authentication hurdles than a person trying to authenticate from a new location. The RSA SecurID® Access Suite, commercially available from RSA, The Security Division of Dell EMC, of Hopkinton, Mass., provides identity and access management tools. With SecurID® Access, for example, administrators can create custom policies that leverage location data of a user to influence the required authentication assurance level (e.g., a low, medium, or high assurance level). Assurance levels comprise logical groupings of authentication methods that include, for example, Biometrics, multi-factor authentication and authentication using one-time passcodes generated by a SecurID® token.

A need exists for improved techniques for obtaining location assurances.

SUMMARY

In one embodiment, a method comprises obtaining a shared secret associated with a client; initiating a challenge to the client in connection with an authentication request by the client from a given location to access a protected resource, wherein the challenge comprises a location indicator selected by an authentication server for the given location; processing a response submitted by the client in response to the challenge, wherein the response comprises the location indicator for the given location modified by the client with the shared secret, and wherein the processing comprises evaluating the response submitted by the client relative to the location indicator selected by the authentication server; and resolving the authentication request based on the evaluating.

In some embodiments, the location indicator comprises an encrypted version of one of a plurality of virtual object images selected by the authentication server for the given location, wherein the client decrypts the encrypted version of the selected virtual object image using the shared secret, and wherein the response comprises a decrypted version of the selected virtual object image. In a further variation, the location indicator optionally comprises one of a plurality of virtual object images selected by the authentication server for the given location, wherein the client modifies the selected virtual object image using the shared secret, and wherein the response comprises the selected virtual object image modified using the shared secret.

Other illustrative embodiments include, without limitation, apparatus, systems, methods and computer program products comprising processor-readable storage media.

DETAILED DESCRIPTION

Figure 1:
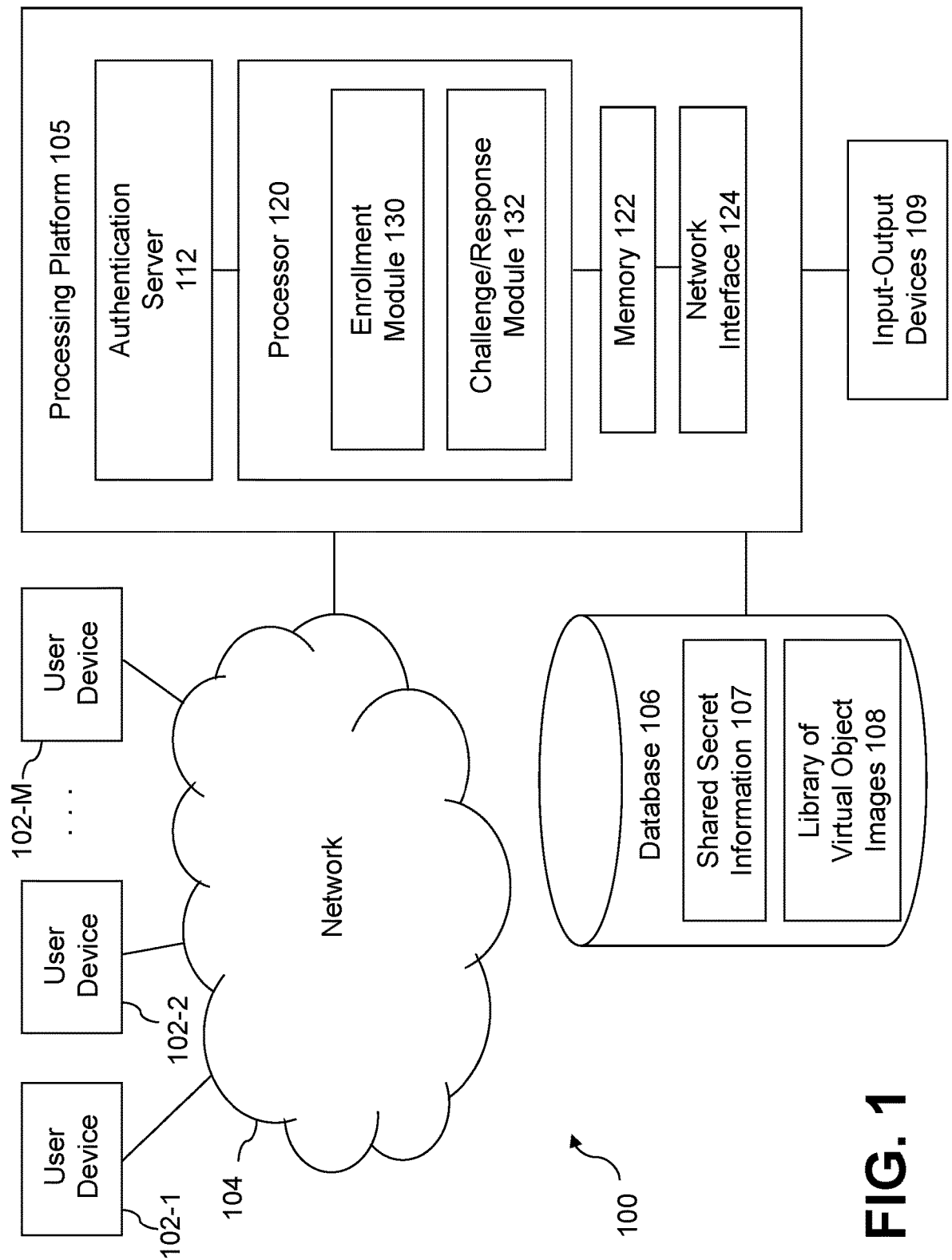
FIG. 1 shows an information processing system configured for performing authentication using a location assurance, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for authenticating a user using an assurance of the location of the user at the time of the authentication.

In one or more embodiments, techniques are provided for obtaining location assurance (e.g., for proving a location of a user at a time of the authentication) using virtual object images, such as augmented reality images, in conjunction with a shared secret. Generally, in at least one embodiment, an authenticating service challenges a user by serving a virtual object image selected by the authentication service based on the location of the user at a time of the authentication request (for example, using Global Positioning System (GPS) coordinates submitted by a client device). For example, in some embodiments, the virtual object images can be served by the authenticating service in a similar manner as some existing video games serve virtual objects, such as Pokémon Go, commercially available from The Pokémon Company of Japan. The user can then establish his or location by opening a mobile application, for example, at or near the specified GPS coordinates to capture an image of the served virtual object image. If the captured object matches the served virtual object image, then the user will have provided a location assurance that can be used as part of an authentication of the user.

One or more aspects of the present disclosure recognize that a location assurance is often dependent upon GPS data from a mobile device, which can often be spoofed. If an attacker can modify a location of a mobile device of a user to a different location than the actual location of the mobile device, then the attacker can intercept the location challenge from an authentication server. For example, consider that an attacker has stolen Active Directory (AD) credentials of a user and proceeds to log into the SID Access application portal. Upon trying to access a protected application, for example, the attacker receives a push notification on his or her mobile device to prove his or her location using the virtual object images as a location assurance, as described above. By hacking the mobile device of the user, the attacker could coerce the mobile application into thinking that the mobile device is at the office of the user, thereby causing SID Access not to challenge the user with a step-up authentication.

In one or more embodiments of the present disclosure, the risk of location spoofing is mitigated by the client and the authentication server negotiating a shared secret prior to the location challenge. This shared secret can then be used by the authentication server, for example, to encrypt the virtual object images. If the client can then send a decrypted virtual object image back to the authentication server, then the user will have successfully established their location. Here, the shared secret creates trust for the client device that provides the GPS coordinates (e.g., with an underlying assumption that trusted devices will not spoof their location). Note that if this assumption is not valid, then the mobile application reporting the location data could take additional measures to ensure data integrity, such as checking for rooted devices, mock location settings, or installed GPS-spoofing applications, as would be apparent to a person of ordinary skill in the art. In a further embodiment, the impact of spoofed GPS information is mitigated by examining the IP address of the device (e.g., from the purview of the service to which the user is authenticating). If performing a geolocation analysis on the IP address yields a materially different result compared to the location provided in the submitted GPS coordinates of the user, the authentication server can treat the GPS coordinates with suspicion and require other forms of access or identity assurances. It is noted that IP-based geolocation can be misleading (e.g., the device might be translated using Network Address Translation (NAT) techniques or the user might be using a VPN, among other things). For the purpose of this disclosure, the service to which the user is authenticating can tolerate some of these inaccuracies by requiring the user to provide additional assurances.

FIG. 1 shows a computer network 100 configured in accordance with an illustrative embodiment of the disclosure. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store shared secret information 107 that includes one or more shared secrets of the user that were submitted, for example, during enrollment and a library of virtual object images 108, as discussed further below. In other embodiments, the client and the authentication server can negotiate a shared secret prior to the location challenge. Generally, in one or more embodiments, an authentication server selects a particular virtual object image as a location indicator for a given location of a user (e.g., a client of the user) at a time of an authentication request. In some embodiments, the virtual object images in the library of virtual object images 108 include augmented reality images and other images.

In some embodiments, a biometric sample of the user can be employed to generate the shared secret, as discussed further below. In this manner, a user attestation is embedded with the shared secret. Similarly, a device fingerprint could be used to generate the shared secret thereby embedding a device attestation.

In some embodiments, an authentication server can store virtual object images in the library of virtual object images 108 for a given user and for predefined locations, such as trusted locations of the user (e.g., based on GPS coordinates). A client mobile application of the user, for example, could then query the authentication server using its current GPS coordinates to retrieve the virtual object image selected by the authentication server for the given location. In an alternate embodiment of the disclosure, the authentication server could dynamically generate virtual object images based on a set of parameters and provide those dynamically generated virtual object images in response to a user query. For example, objects can be generated dynamically based on a plurality of factors including, but not necessarily limited to, the identity of the user, the location(s) where those virtual object images will be placed, the time at which the request is being made, a randomly generated nonce, and secret key material known only to the authentication server.

The database 106 in the present embodiment is implemented using one or more storage systems associated with the processing platform 105. Such storage systems can comprise any of a variety of different types of storage including, for example, network-attached storage (NAS), storage area networks (SANs), direct-attached storage (DAS) and distributed DAS, as well as combinations of these and other storage types, including software-defined storage.

Also associated with processing platform 105 are input-output devices 109, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

Figure 2:
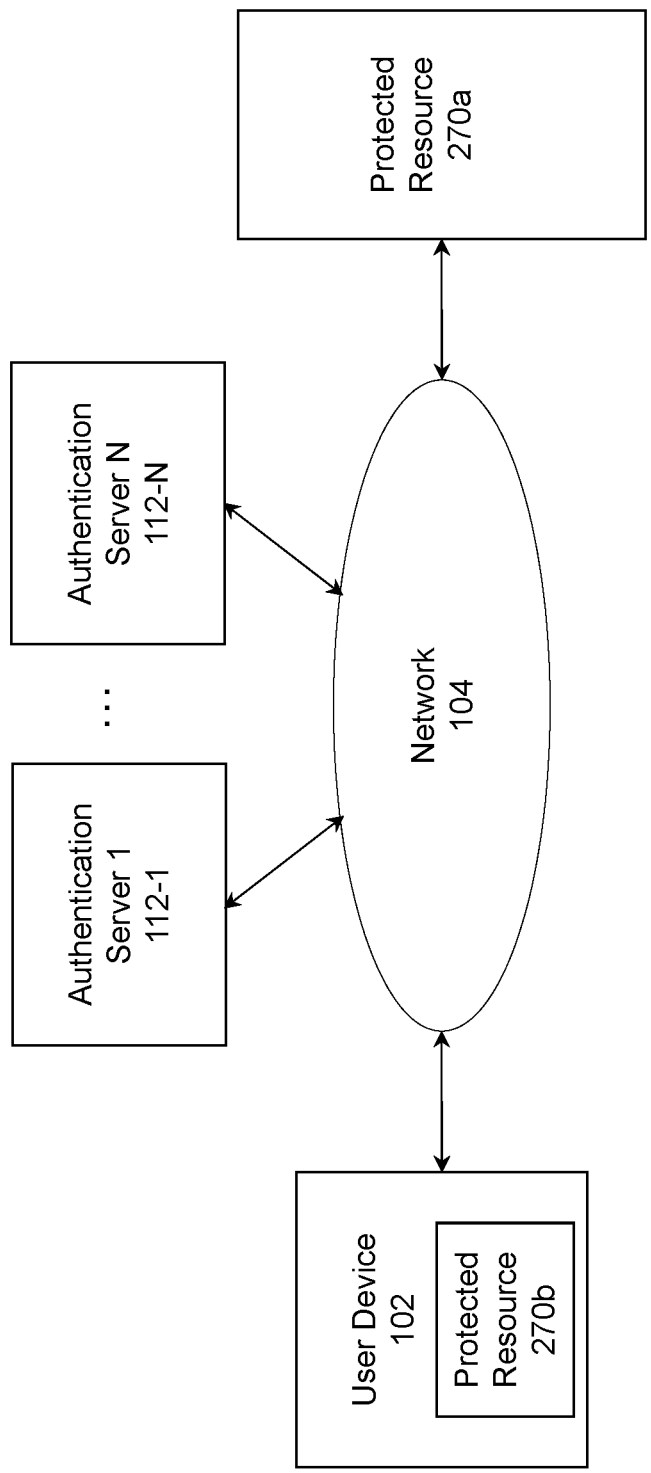
FIG. 2 shows another information processing system configured for performing authentication using location assurance in at least one embodiment of the disclosure.

In one or more embodiments of the disclosure (such as the example embodiment depicted in FIG. 1), the processing platform 105 comprises an authentication server 112. Authentication events, such as an evaluation of a virtual object image modified by a shared secret of a user, initiated at respective ones of the user devices 102, are directed to the authentication server 112 over the network 104 for processing. The authentication server 112 can determine if a given access attempt is authentic, based on the determined likelihood of plausibility or matching of the responsive virtual object image modified by the shared secret submitted in response to a challenge with the initial location indicator selected by the authentication server. Upon verification of the presented authentication factors, the authentication server 112 grants the requesting user device 102 access to one or more protected resources of the computer network 100 (such as further depicted in FIG. 2, for example). Although shown as an element of the processing platform 105 in this embodiment, the authentication server 112 in other embodiments (such as depicted in FIG. 2, for example) can be implemented at least in part externally to the processing platform 105, for example, as a stand-alone server, set of servers or other type of authentication system coupled to the network 104.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the disclosure include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, and illustratively comprises one or more conventional transceivers.

The processor 120 further comprises an enrollment module 130 and a challenge/response module 132. The enrollment module 130 is employed in some embodiments when the user submits a shared secret as part of an enrollment process (as opposed to dynamically negotiating a shared secret prior to an authentication attempt).

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be distributed across multiple processing nodes, or separated across a larger number of modules within processor 120. As another example, multiple distinct processors can be used to implement different ones of the modules 130 and 132 or portions thereof.

At least portions of the enrollment module 130 and/or challenge/response module 132 may be implemented at least in part in the form of software that is stored in memory 122 and executed by processor 120. Similarly, at least portions of the authentication server 112 of the processing platform 105 can be implemented at least in part in the form of software that is stored in memory 122 and executed by processor 120.

It is to be understood that the particular set of elements shown in FIG. 1 for authentication of a user using an assurance of the location of the user at the time of the authentication, in authentication processes involving user devices 102 of computer network 100, is presented by way of illustrative example only, and in other embodiments additional or alternative elements may be used. Thus, another embodiment may include additional or alternative systems, devices and other network entities, as well as different arrangements of modules and other components.

By way of example, in other embodiments, the processing platform 105 can be eliminated and associated elements such as authentication server 112, enrollment module 130 and/or challenge/response module 132 can be implemented elsewhere in the computer network 100.

An exemplary process utilizing enrollment module 130 of the processing platform 105 in computer network 100 will be described in more detail with reference to the flow diagram of FIG. 5. An exemplary process utilizing challenge/response module 132 of the processing platform 105 in computer network 100 will be described in more detail with reference to the flow diagram of FIG. 6.

FIG. 2 is a system diagram of an illustrative embodiment of the disclosure. By way of illustration, FIG. 2 depicts an alternative embodiment to FIG. 1, wherein the authentication server(s) 112 is/are not resident on the processing platform 105 or user device(s) 102, but rather are separate devices. Accordingly, as depicted in FIG. 2, user device 102 communicates with a protected resource 270a over network 104. As detailed further below, at least one embodiment of the disclosure can also include a user device 102 that includes a protected resource 270b residing thereon. In an example implementation, a user authenticates online with one or more authentication servers 112-1 through 112-N (hereinafter, collectively referred to as authentication servers 112) before obtaining access to protected resource 270a and/or 270b (hereinafter, collectively referred to as protected resource 270 unless otherwise specified).

According to one aspect of the disclosure, as noted above, the user of the user device 102 is authenticated by authentication servers 112 using a location assurance of the user based on a modification to a selected location indicator using a shared secret of the user, and/or other forms of cryptographic information. The exemplary communications among the system elements 102, 104 and 270 of FIG. 2 employed to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the disclosure.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, biometric sample, one-time password (OTP), or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, data store, web site or hardware device. In other words, a protected resource 270 is a resource that grants user access responsive to an authentication process, as will be described in greater detail below. For example, protected resource 270a may include an access-controlled file, an e-mail, a protected application, a remote application server such as a web site or other software program or hardware device that is accessed by the user device 102 over a network 104.

Additionally, in at least one embodiment of the disclosure, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access-controlled file, e-mail, protected application, remote application server such as a web site or other software program or hardware device that is accessed by the user device 102 over network 104. Similarly, it is possible that in order to unlock the mobile platform to perform operations, a successful authentication might be required.

Figure 3:
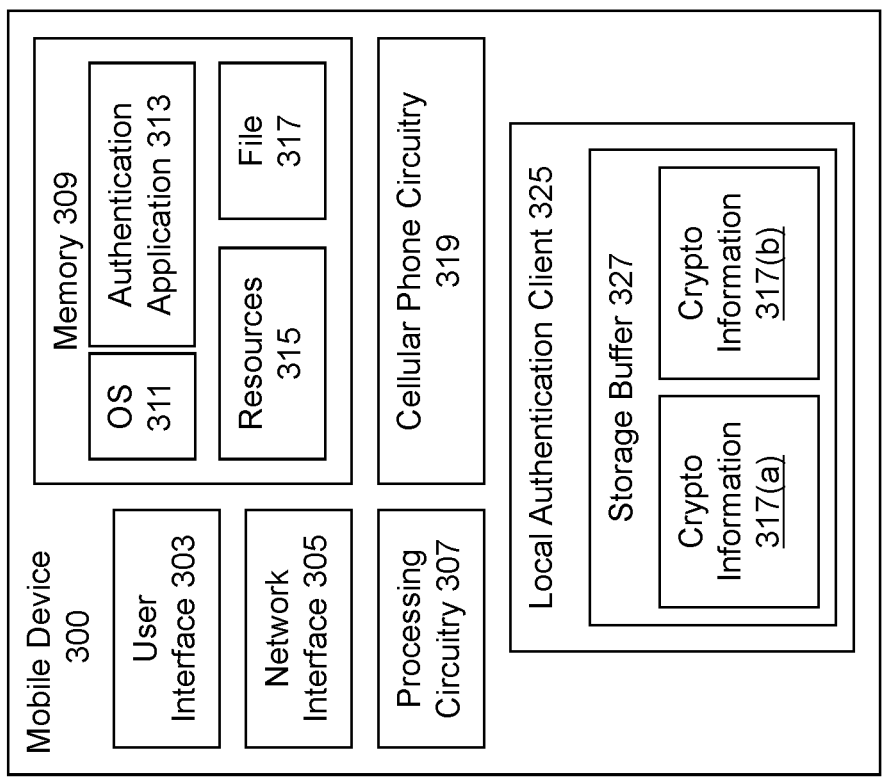
FIG. 3 is a system diagram of an exemplary mobile device on which at least one embodiment of the disclosure can be implemented.

FIG. 3 is a system diagram of an exemplary mobile device 300 on which at least one embodiment of the disclosure can be implemented. By way of illustration, as shown in FIG. 3, the exemplary mobile device 300 comprises a user interface 303 configured to receive user input and provide user output, such as a data file and/or data file location selection(s), such as described herein. One or more embodiments of the disclosure can include components such as a display screen, a capacitive touch display, and a push-button keyboard implemented for use in connection with the user interface 303.

Additionally, the mobile device 300 includes a network interface 305 configured to connect the mobile device 300 to a communications medium such as, for example, Wi-Fi and/or cellular telephony. Accordingly, the network interface 305 enables the mobile device 300 to communicate with the other components of an electronic environment.

The mobile device 300 further comprises a memory 309 configured to store one or more software constructs including, for example, an operating system 311, an authentication application 313, data for protected resources 315 (e.g., documents and restricted applications), a cryptographic information file 317, as well as other suitable or relevant material.

In one or more embodiments, processing circuitry 307 of the mobile device 300 is configured to operate in accordance with the software constructs stored in the memory 309. By way of example, when the processing circuitry 307 runs the operating system 311, the processing circuitry 307 provides a secure electronic platform on which a user is able to carry out work. Such an electronic platform is capable of operating, for example, as a container to protect data requiring user authentication before permitting access. Further, when the processing circuitry 307 runs the authentication application 313, the processing circuitry 307 communicates with a local authentication client 325 in a secure manner, for example, to obtain cryptographic information 317(a), 317(b) from a storage buffer 327, as additionally described herein.

Additionally, for completeness, cellular phone circuitry 319 within mobile device 300 allows the user to establish cellular phone calls with other callers having remote devices, as would be appreciated by one skilled in the art.

It should be appreciated that the processing circuitry 307 can include one or more processors running specialized software components, such as detailed in connection with the techniques detailed herein and further depicted in FIG. 4.

In at least one embodiment of the disclosure, once the mobile device 300 is able to obtain valid cryptographic information, the user of the mobile device 300 is able to perform local user authentication to access protected resources. Accordingly, as noted, the mobile device 300 is provisioned with the authentication application 313 and cryptographic information file 317 holding cryptographic information to be used in connection with an authentication process. For example, and as further detailed herein, such cryptographic information within cryptographic information file 317 can include one or more shared secrets of the user in some embodiments.

Consequently, the processing circuitry 307 of the mobile device 300 can perform a local authentication operation using cryptographic information file 317 stored in the memory 309. In at least one embodiment of the disclosure the processing circuitry 307 runs the authentication application 313, which directs the user of the mobile device 300, via the user interface 303, to enter cryptographic information (such as, for example, a selected location indicator modified using a shared secret of the user) which is captured as one or more input elements 317(*a*), 317(*b*), etc. While the captured cryptographic information 317(*a*), 317(*b*), etc. is temporarily stored in the storage buffer 327 of the local authentication client 325, the authentication application 313 compares the captured user-provided cryptographic information 317(*a*), 317(*b*), etc. with a reference shared secret of the user provided during enrollment in file 317 (or dynamically negotiated with the authentication server) to determine a likelihood of a match and/or plausibility of the user-provided location indicator modified by the shared secret of the user.

If a match or otherwise positive resolution is determined via this comparison, the authentication application 313 permits the user to access a protected resource (such as, for example, data in association with element 315 that are stored in the memory 309).

Figure 4:
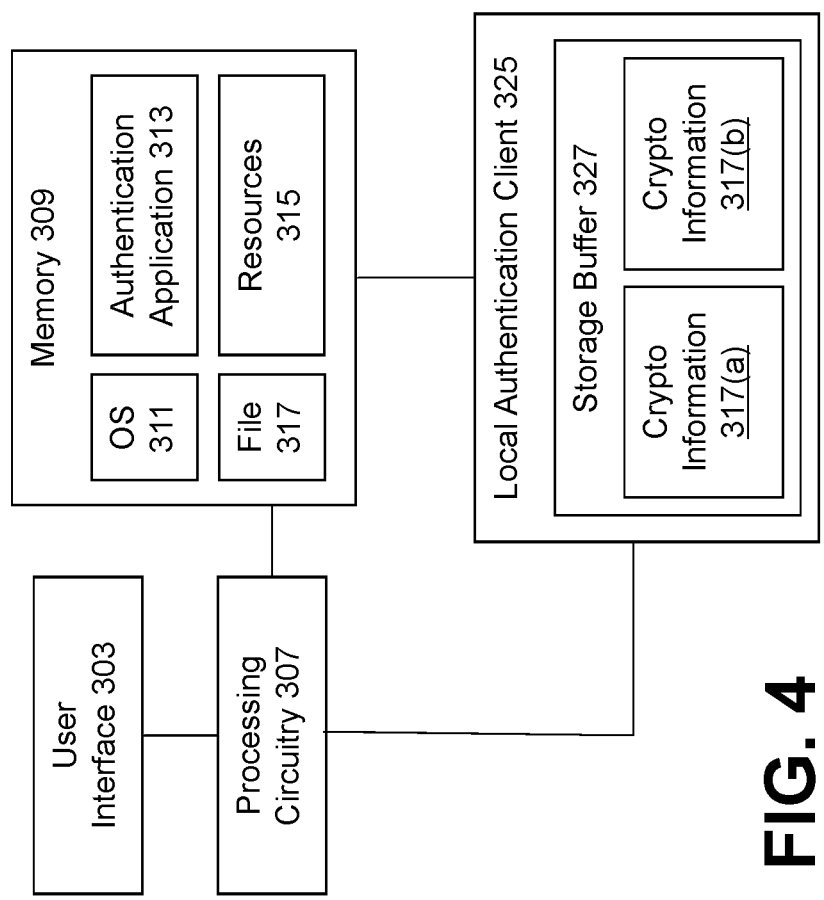
FIG. 4 is a system diagram of exemplary mobile device components, in accordance with one embodiment of the disclosure.

FIG. 4 is a system diagram of exemplary mobile device components, in accordance with at least one embodiment of the disclosure. As depicted in FIG. 4, a user can enter cryptographic information via user interface 303. This entered cryptographic information is captured as one or more input elements 317(*a*), 317(*b*). Such input elements can include, as noted above, the user-provided shared secrets of the user.

Accordingly, the captured one or more input elements 317(*a*), 317(*b*), etc. can be stored in cryptographic information file 317 to be subsequently used in conjunction with fuzzy logic to carry out an authentication process.

Consequently, a corresponding cryptographic flow (carried out, for example, by authentication application 313 as run by operating system 311) can take the following exemplary form. The user is prompted (via user interface 303) as part of a challenge to enter cryptographic information (such as shared secrets of the user) in connection with an authentication request to access a protected resource associated with the mobile device (for example, the user wishes to access and/or unlock his or her smart phone). The entered cryptographic information is captured by the processing circuitry 307 as one or more input elements 317(*a*), 317(*b*) that are temporarily stored in the storage buffer 327 of the local authentication client 325.

Subsequently, the authentication application 313 compares the captured user-provided cryptographic information 317(*a*), 317(*b*), etc. with the original challenge in file 317 stored in memory 309 to determine a likelihood of a match and/or plausibility of the user-provided response(s). If the user-entered input elements 317(*a*), 317(*b*) are deemed to be matching and/or plausible, authentication is deemed successful and the user is granted access to the protected resource in question.

As noted above, in one or more embodiments, a user is authenticated using a location assurance based on a selected location indicator modified by a shared secret of the user. In response to a challenge, a user submits the location indicator selected by the authentication server for the given location modified with the shared secret. An authentication decision is made by determining a likelihood that the user response submitted in response to the challenge matches the location indicator selected by the authentication server.

Figure 5:
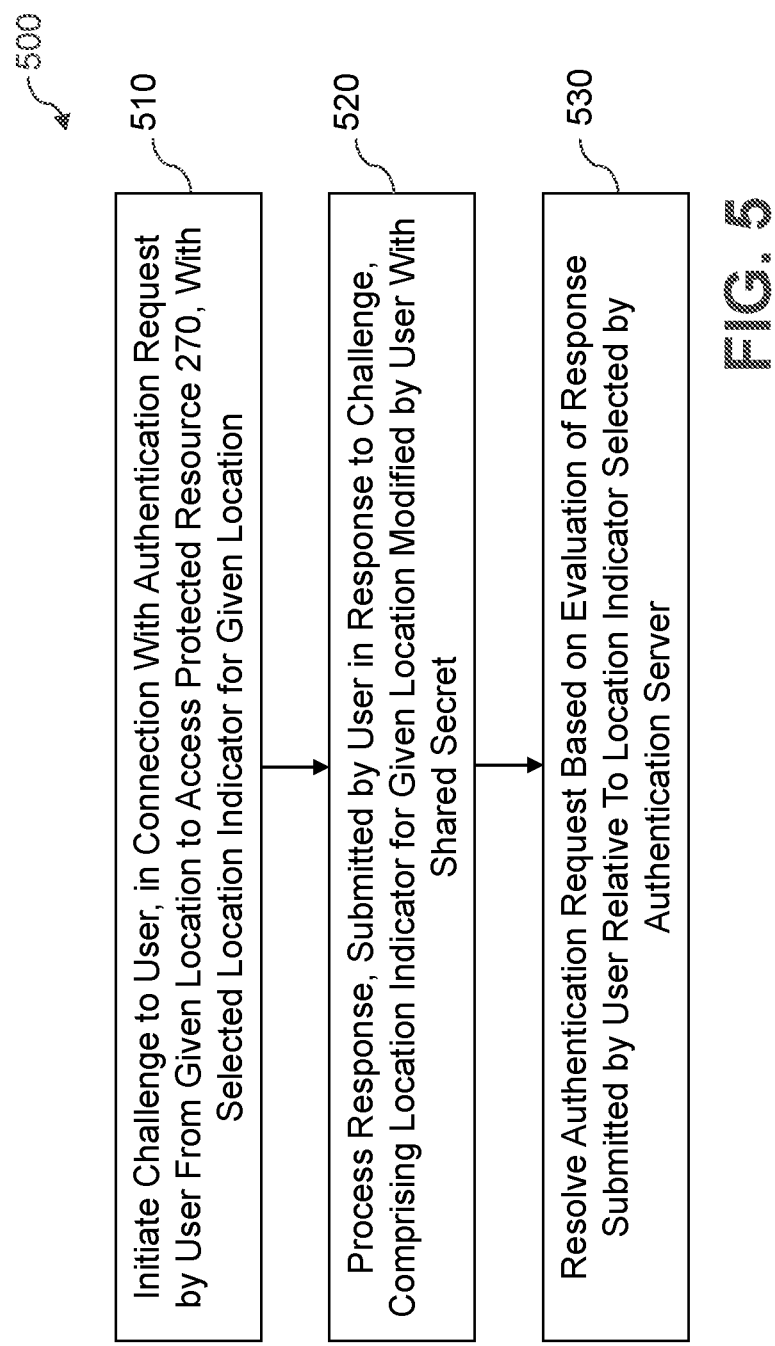
FIG. 5 is a flow diagram of an authentication process using location assurance in one illustrative embodiment.

FIG. 5 is a flow diagram of an exemplary authentication process 500 using location assurance in one illustrative embodiment. As shown in FIG. 5, the exemplary location assurance authentication process 500 initiates a challenge to the user (e.g., a client of the user) during step 510, in connection with an authentication request by the user from a given location to access a protected resource. In some embodiments, the challenge of step 510 comprises a location indicator selected by an authentication server for the given location.

During step 520, the exemplary location assurance authentication process 500 processes a response submitted by the user in response to the challenge. In one or more embodiments, the response of step 520 comprises the location indicator for the given location modified by the user with the shared secret of the user. Generally, as discussed herein, the processing comprises evaluating the response submitted by the user during step 520, relative to the location indicator selected by the authentication server during step 510.

Finally, the exemplary location assurance authentication process 500 resolves the authentication request during step 530 based on the evaluation of the response submitted by the user during step 520 relative to the location indicator selected by the authentication server during step 510.

In some embodiments, the permissable distance from a registered "safe" location of the user can be configured by the authenticating service. For environments with less strict security requirements, the permissable distance could be configured to be within miles; for more secure environments, the permissable distance could be configured to the range defined, for example, by the current state-of-the-art mobile devices (which is currently on the order of several feet, but in the future could be on the order of inches). In addition, indoor positioning systems can optionally be employed as well.

Figure 6:
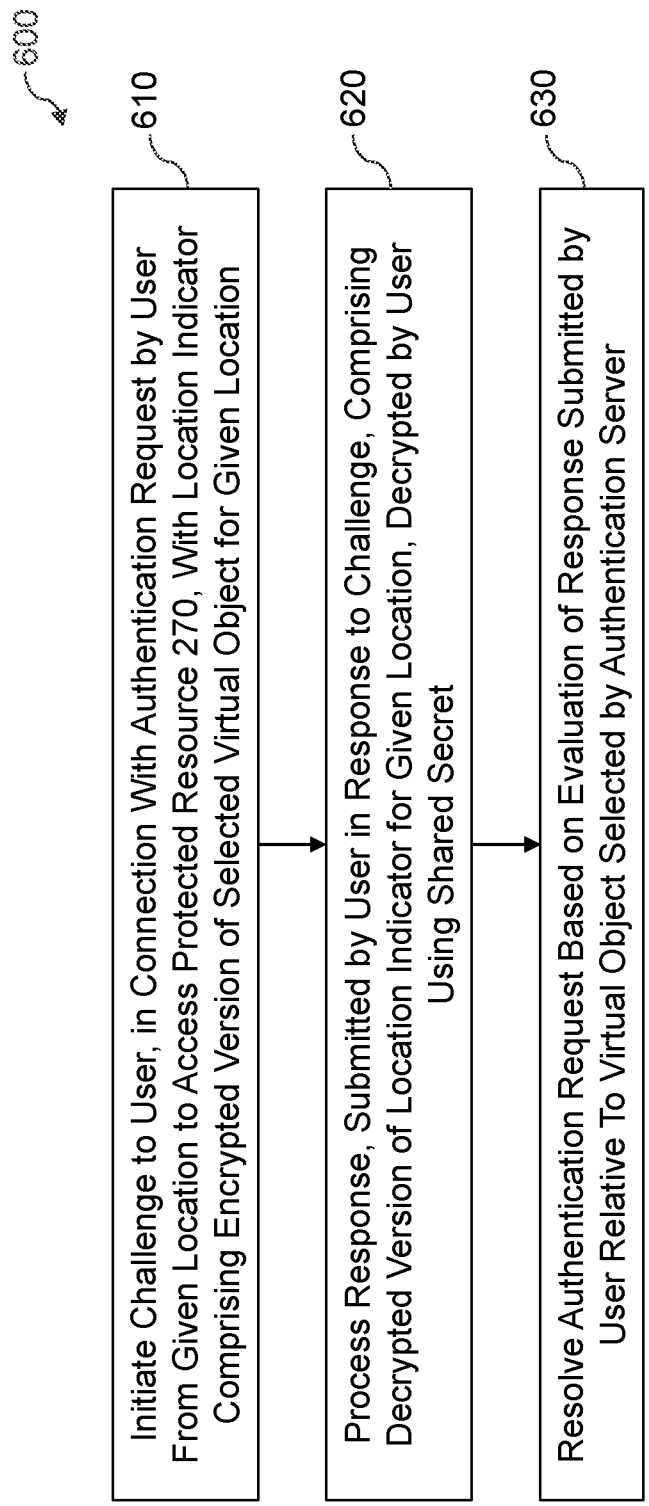
FIG. 6 is a flow diagram of a location assurance authentication process based on a location indicator encrypted using a shared secret of a user, according to one illustrative embodiment of the disclosure.

FIG. 6 is a flow diagram of an exemplary location assurance authentication process 600 based on a location indicator encrypted using a shared secret of a user, according to one illustrative embodiment of the disclosure. Generally, in the embodiment of FIG. 6, the exemplary location assurance authentication process 600 employs encryption by the authentication server of the location indicator using the shared secret of the user and decryption by the user of the encrypted location indicator using the shared secret of the user.

For example, a client device can query the authentication server for a location challenge as part of an authentication request by sending the GPS coordinates of the client device. The authentication server responds with an encrypted location indicator (e.g., an encrypted virtual object image selected by the authentication server for the current location of the user). The client device decrypts the challenge using the shared secret and sends back the decrypted location indicator to the authentication server for evaluation. This would prove the location attestation (GPS coordinates) came from a trusted device or user that had possession of the shared secret.

As shown in FIG. 6, the exemplary location assurance authentication process 600 initiates a challenge to the user (e.g., a client of the user) during step 610, in connection with an authentication request by the user from a given location to access a protected resource. In some embodiments, the location indicator of the challenge of step 610 comprises an encrypted version of a virtual object image selected by the authentication server for the given location.

During step 620, the exemplary location assurance authentication process 600 processes a response submitted by the user in response to the challenge. In one or more embodiments, the response of step 620 comprises a decrypted version of the location indicator for the given location, where the decryption is performed by the user using the shared secret of the user. Generally, as discussed herein, the processing comprises evaluating the response submitted by the user during step 620, relative to the location indicator selected by the authentication server during step 610.

Finally, the exemplary location assurance authentication process 600 resolves the authentication request during step 630 based on the evaluation of the response submitted by the user during step 620 relative to the location indicator selected by the authentication server during step 610.

Thus, the location indicator processed by the exemplary location assurance authentication process 600 comprises an encrypted version of a virtual object image selected by the authentication server for the given location, and the client decrypts the encrypted version of the selected virtual object image using the shared secret. In this manner, the response comprises a decrypted version of the selected virtual object image.

Figure 7:
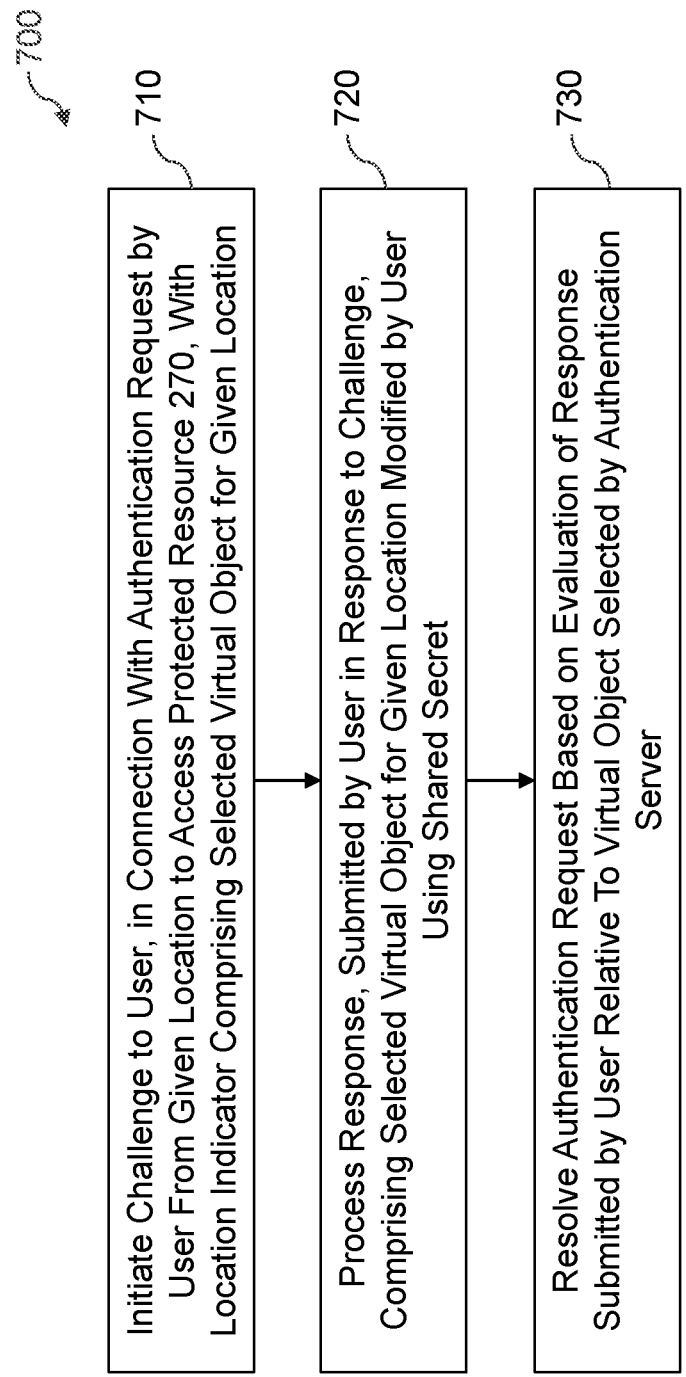
FIG. 7 is a flow diagram of a location assurance authentication process based on a location indicator modified using a shared secret of a user, according to one illustrative embodiment of the disclosure.

FIG. 7 is a flow diagram of a location assurance authentication process 700 based on a location indicator of a user modified using a shared secret of the user, according to one illustrative embodiment of the disclosure. Generally, in the embodiment of FIG. 7, the exemplary location assurance authentication process 700 employs a modification of the virtual object image selected by the authentication server for the given location of the authentication, using the shared secret of the user.

The image alteration embodiment of FIG. 7 may be employed, for example, when encryption is not possible on the client device. The client device can query the server for a location challenge, for example, by sending the current GPS coordinates of the client device. The authentication server responds with a location indicator (e.g., a virtual object image selected for the current location). The client device applies the shared secret to alter the selected virtual object image using the shared secret (e.g., a color variation of the selected virtual object image) and sends back the altered location indicator to the authentication server as part of the response. The authentication server then verifies that the selected virtual object image was altered in the expected manner for the shared secret of this user.

As shown in FIG. 7, the exemplary location assurance authentication process 700 initiates a challenge to the user (e.g., a client of the user) during step 710, in connection with an authentication request by the user from a given location to access a protected resource. In some embodiments, the location indicator of the challenge of step 710 comprises a selected virtual object for given location.

During step 720, the exemplary location assurance authentication process 700 processes a response submitted by the user in response to the challenge. In one or more embodiments, the response of step 720 comprises the selected virtual object for the given location modified by the user using the shared secret of the user. Generally, as discussed herein, the processing comprises evaluating the response submitted by the user during step 720, relative to the location indicator selected by the authentication server during step 710.

Finally, the exemplary location assurance authentication process 700 resolves the authentication request during step 730 based on the evaluation of the response submitted by the user during step 720 relative to the virtual object image selected by the authentication server during step 710.

Thus, the location indicator processed by the exemplary location assurance authentication process 700 of FIG. 7 comprises a virtual object image selected by the authentication server for the given location. The user modifies the selected virtual object image using the shared secret, and the response comprises the selected virtual object image modified using the shared secret.

In lieu of encryption, the shared secret could instead be used by the exemplary location assurance authentication process 700 of FIG. 7 to filter or alter the served virtual objects. As noted above, this approach could prove useful for mobile devices that support limited cryptographic operations. In this case, the client sends the virtual objects back to the server altered/filtered in the same way, based on the shared secret of the user, to prove their location. An altered object can be presented to the user in a way that does not detract from usability. For example, there may be various attributes of the object, such as the shape of its components, the overall color of the object, the color of specific parts of the object (e.g., the eye color), the presence of different characteristics on the object (e.g., a tail), the orientation of the object, and so on. Each of these attributes can encode multiple bits of information and in total can easily encode a shared secret of sufficiently high entropy (e.g., 256 bits or even 128 bits are more than enough for security sensitive applications).

In the context of the exemplary location assurance authentication processes 500, 600, 700, of FIGS. 5 through 7, respectively, the initiating step generates the challenge, and the processing step that verifies the response. The initiating step and the processing step can be performed by the same device (e.g., authentication server 112 of FIG. 1), in some embodiments, or by a plurality of distributed devices (e.g., authentication servers 112-1 through 112-N of FIG. 2), as would be apparent to a person of ordinary skill in the art.

Accordingly, the particular processing operations and other network functionality described in conjunction with the flow diagrams of FIGS. 5 through 7 are presented by way of illustrative example only, and should not be construed as limiting the scope of the disclosure in any way. Alternative embodiments can use other types of processing operations to compare a responsive location indicator modified by a shared secret received in response to a challenge based on a reference shared secret submitted during an enrollment phase in order to make an authentication decision. For example, the ordering of the process steps may be varied in other embodiments, or certain steps may be performed concurrently with one another rather than serially.

The exemplary descriptions of the present disclosure should not be construed as limiting the mechanisms by which identity assurance information can be codified. For example, a basic stratification of assurance levels can be computed (e.g., a low, medium or high assurance level). Alternatively, assurance can be computed as a score (e.g., between 0 and 100). Assurance can also be derived through other means, such as a rules engine, and the underlying rules themselves can be derived either manually or through a machine learning based approach, as would be apparent to a person of ordinary skill in the art.

Note that there are numerous methods in the art for negotiating a shared secret. The choice of method is largely orthogonal to the present disclosure. One or more aspects of the present disclosure, however, recognize that some methods for negotiating a shared secret can provide additional assurances. For example, a secret key can be negotiated based on a user biometric (e.g., by applying a fuzzy hash to a normalized version of a fingerprint or iris scan). In this way, the authentication server also gets a biometric assurance in addition to a location assurance. Alternatively, the negotiated secret key can depend upon information specific to the mobile device (e.g., a hardware unique device identifier) thereby creating a device assurance in addition to a location assurance. As yet another option, password authenticated key exchange (PAKE) protocols, which are well known in the art, can be used to generate strong cryptographic keys that are tied to a user password, but provide significant additional security benefits against various types of attack scenarios (e.g., offline dictionary attacks with client or server compromise).

In some embodiments, the disclosed techniques for authenticating a user using an assurance of the location of the user at the time of the authentication attains reliable location attestations from users with mobile devices and other device types. Since GPS data and other location data can be spoofed on mobile devices, for example, the use of the shared secret optionally creates additional assurances related to a device and/or biometric of a user. The disclosed virtual object images, including augmented reality images, are just one discrete application of the idea. The disclosed techniques could also be implemented in more seamless or invisible ways, such as a background service or as part of a mobile library or software development kit, as would be apparent to a person of ordinary skill in the art.

Among other benefits, the disclosed techniques for authenticating a user using a location indicator of the user at the time of the authentication modified by a shared secret of the user provide improved location assurance capabilities that mitigate against device location spoofing. In this manner, the disclosed authentication techniques based on a location indicator of the user at the time of the authentication modified by a shared secret of the user provide the benefit of being resilient to device spoofing by an attacker.

One or more embodiments of the disclosure provide improved methods, apparatus and computer program products for authenticating a user using an assurance of the location of the user at the time of the authentication. The foregoing applications and associated embodiments should be considered as illustrative only, and numerous other embodiments can be configured using the techniques disclosed herein, in a wide variety of different applications.

It should also be understood that the disclosed location assurance authentication techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for authenticating a user using shared secrets of the user may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based location assurance authentication engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based location assurance authentication platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
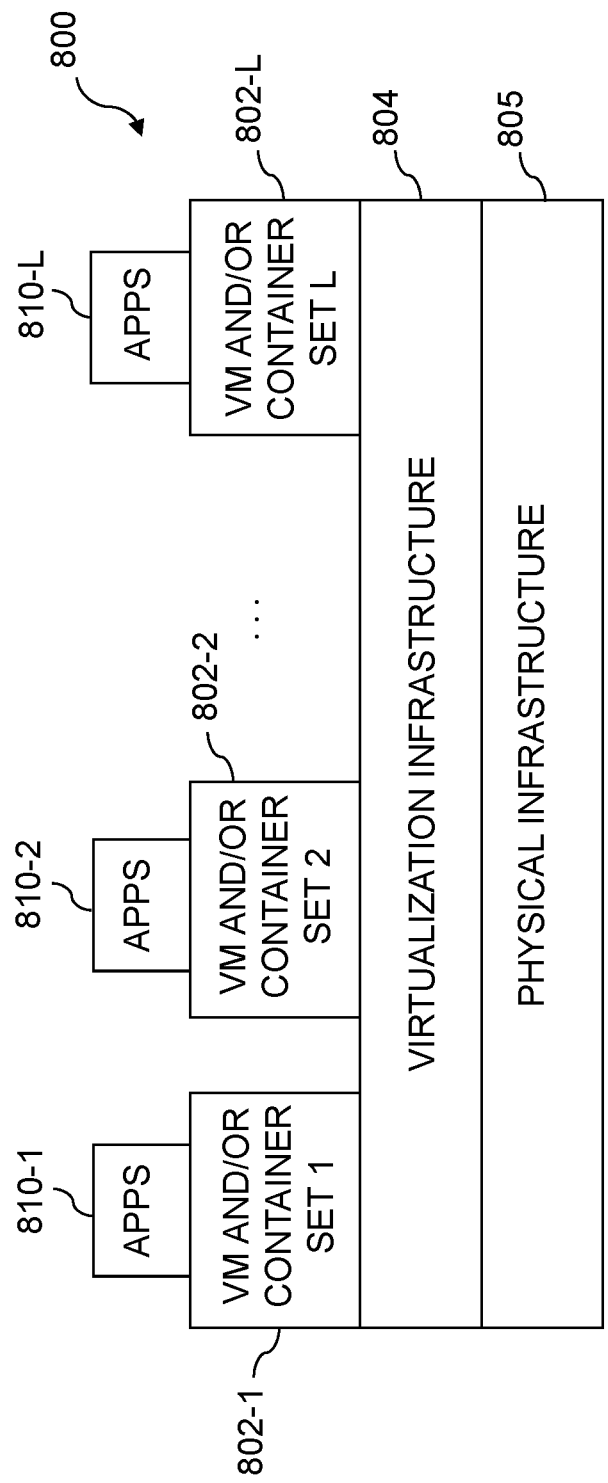
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the disclosed location assurance authentication system. The cloud infrastructure 800 comprises multiple virtual machines (VMs) and/or container sets 802-1, 802-2, . . . 802-L implemented using virtualization infrastructure 804.

The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide location assurance authentication functionality of the type described above for one or more processes running on a given one of the VMs. For example, each of the VMs can implement location assurance authentication control logic and associated shared secret enrollment techniques for providing location assurance authentication functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide location assurance authentication functionality of the type described above for one or more processes running on different ones of the containers. For example, a container host device supporting multiple containers of one or more container sets can implement one or more instances of location assurance authentication control logic and associated shared secret enrollment features for use in evaluating a response comprising a location indicator for the location of the authentication, modified by with the shared secret of a user (e.g., a client of the user) to be compared to a location indicator selected by the authentication server for the authentication.

As is apparent from the above, one or more of the processing modules or other components of the authentication server 112 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
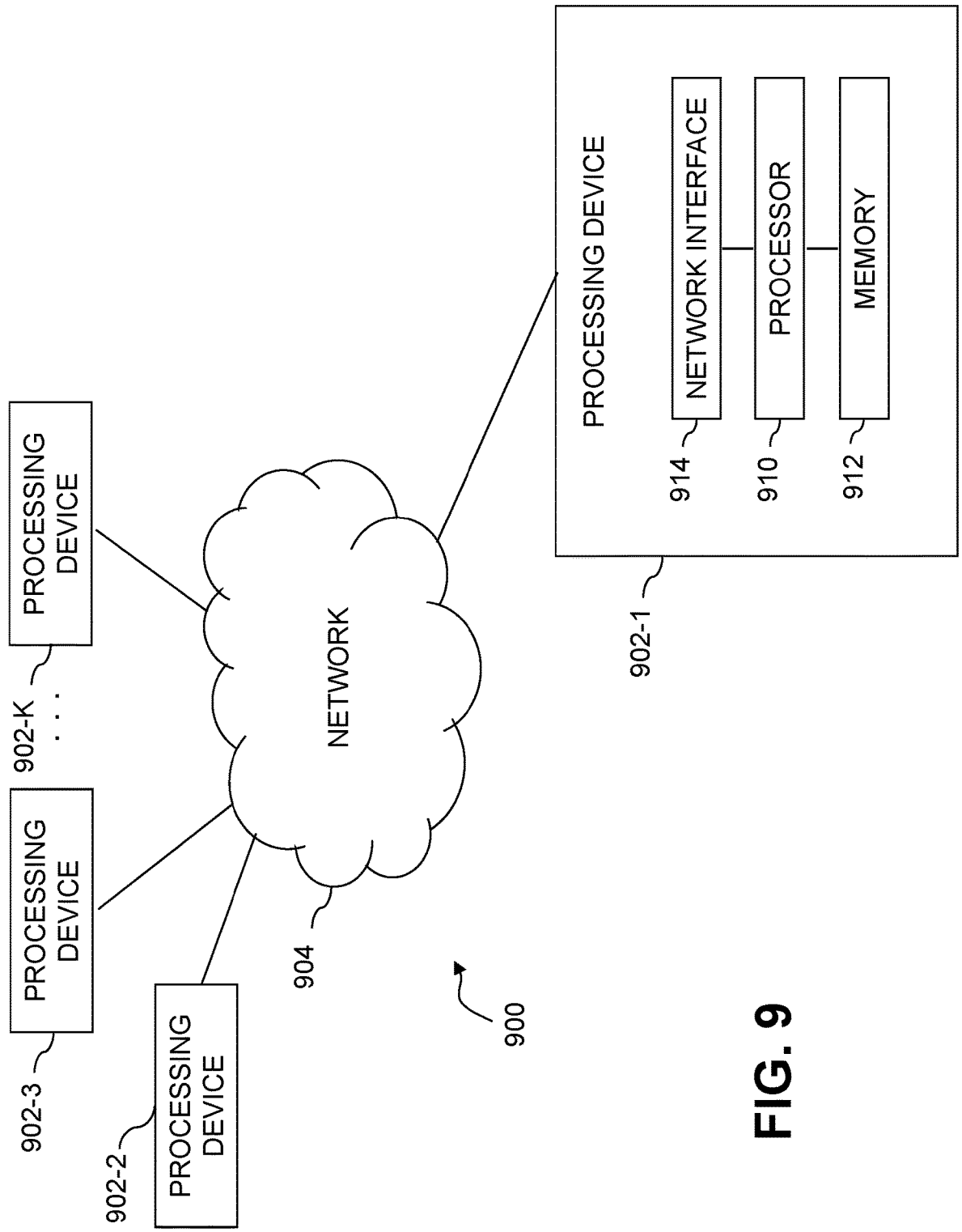
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   negotiating a shared secret based on a user biometric during an enrollment process;
   after negotiating the shared secret, initiating a challenge to a client in connection with an authentication request comprising specified GPS coordinates from the client from a given location to access a protected resource, wherein the challenge comprises a location indicator selected for the given location of the client comprising an encrypted version of an augmented reality image selected by an authentication server for the given location and dynamically generated based, at least in part, on the specified GPS coordinates of the client at the time of the challenge;
   processing, using at least one processing device, a response submitted by the client in response to the challenge, wherein:
      the response matches a decrypted version of the location indicator comprising the augmented reality image for the given location, wherein the decrypted image is decrypted by the client with the shared secret and the response is captured after receiving the challenge at or near the specified GPS coordinates; and
      the processing comprises evaluating the response submitted by the client relative to the location indicator selected by the authentication server; and
   resolving, using the at least one processing device, the authentication request based on the evaluating.

2. The method of claim 1, wherein the location indicator comprises an encrypted version of one of a plurality of virtual object images selected by the authentication server for the given location.

3. The method of claim 1, wherein the client modifies the augmented reality image using the shared secret, and wherein the response comprises the augmented reality image modified using the shared secret.

4. The method of claim 1, wherein the modification by the client of the location indicator for the given location with the shared secret comprises one or more of decrypting the encrypted version of the location indicator with the shared secret, filtering the location indicator with the shared secret, and altering the location indicator with the shared secret.

5. The method of claim 1, wherein the evaluating comprises determining if the client modified the location indicator for the given location with the shared secret in an expected manner based on the shared secret stored by the authentication server.

6. The method of claim 1, wherein the location indicator is derived from one or more of a set of global positioning system coordinates of the client at the given location, an Internet Protocol address associated with a device of the client at the given location, and an identifier of a predefined location of the client.

7. The method of claim 1, wherein the client queries the authentication server, at a time of the authentication request by the client to access the protected resource, with the given location of the client to obtain the location indicator from the authentication server.

8. The method of claim 1, wherein a confidence level of the evaluating required for the client to access the protected resource is configurable based on security requirements of a given protected resource.

9. The method of claim 1, wherein the shared secret is negotiated between the client and the authentication server using one or more of a biometric assurance, a device assurance and a client-specific cryptographic key assurance.

10. A system, comprising:
    a memory; and
    at least one processing device, coupled to the memory, operative to implement the following steps:
       negotiating a shared secret based on a user biometric during an enrollment process;
       after negotiating the shared secret, initiating a challenge to a client in connection with an authentication request comprising specified GPS coordinates from the client from a given location to access a protected resource, wherein the challenge comprises a location indicator selected for the given location of the client comprising an encrypted version of an augmented reality image selected by an authentication server for the given location and dynamically generated based, at least in part, on the specified GPS coordinates of the client at the time of the challenge;
       processing a response submitted by the client in response to the challenge, wherein:
          the response matches a decrypted version of the location indicator comprising the augmented reality image for the given location, wherein the decrypted image is decrypted by the client with the shared secret and the response is captured after receiving the challenge at or near the specified GPS coordinates; and
          the processing comprises evaluating the response submitted by the client relative to the location indicator selected by the authentication server; and
       resolving the authentication request based on the evaluating.

11. The system of claim 10, wherein the location indicator comprises an encrypted version of one of a plurality of virtual object images selected by the authentication server for the given location.

12. The system of claim 10, wherein the client modifies the augmented reality image using the shared secret, and wherein the response comprises the augmented reality image modified using the shared secret.

13. The system of claim 10, wherein the modification by the client of the location indicator for the given location with the shared secret comprises one or more of decrypting the encrypted version of the location indicator with the shared secret, filtering the location indicator with the shared secret, and altering the location indicator with the shared secret.

14. The system of claim 10, wherein the modification by the client of the location indicator for the given location with the shared secret comprises one or more of decrypting the encrypted version of the location indicator with the shared secret, filtering the location indicator with the shared secret, and altering the location indicator with the shared secret.

15. A computer program product, comprising a non-transitory machine-readable storage medium having encoded therein executable code of one or more software programs, wherein the one or more software programs when executed by at least one processing device perform the following steps:

negotiating a shared secret based on a user biometric during an enrollment process;

after negotiating the shared secret, initiating a challenge to a client in connection with an authentication request comprising specified GPS coordinates from the client from a given location to access a protected resource, wherein the challenge comprises a location indicator selected for the given location of the client comprising an encrypted version of an augmented reality image selected by an authentication server for the given location and dynamically generated based, at least in part, on the specified GPS coordinates of the client at the time of the challenge;

processing a response submitted by the client in response to the challenge, wherein:

the response matches a decrypted version of the location indicator comprising the virtual object augmented reality image for the given location, wherein the decrypted image is decrypted by the client with the shared secret and the response is captured after receiving the challenge at or near the specified GPS coordinates; and the processing comprises evaluating the response submitted by the client relative to the location indicator selected by the authentication server; and resolving the authentication request based on the evaluating.

16. The computer program product of claim 15, wherein the location indicator comprises an encrypted version of one of a plurality of virtual object images selected by the authentication server for the given location.

17. The computer program product of claim 15, wherein the client modifies the augmented reality image using the shared secret, and wherein the response comprises the augmented reality image modified using the shared secret.

18. The computer program product of claim 15, wherein the modification by the client of the location indicator for the given location with the shared secret comprises one or more of decrypting the encrypted version of the location indicator with the shared secret, filtering the location indicator with the shared secret, and altering the location indicator with the shared secret.

19. The computer program product of claim 15, wherein the evaluating comprises determining if the client modified the location indicator for the given location with the shared secret in an expected manner based on the shared secret stored by the authentication server.

* * * * *